J. F. COLLINS.
NUT LOCK.
APPLICATION FILED AUG. 7, 1915. RENEWED DEC. 8, 1917.
1,272,380.
Patented July 16, 1918.
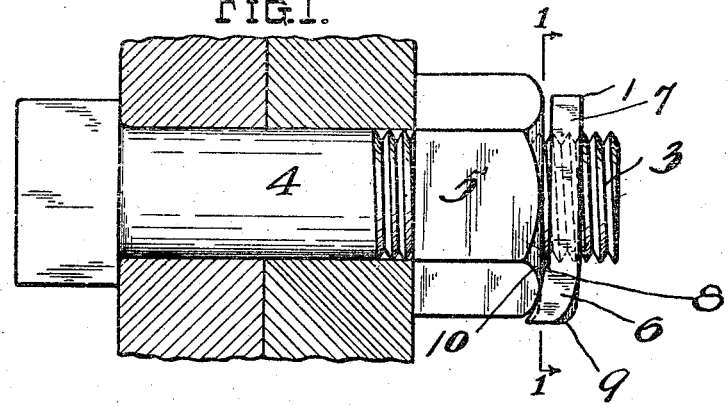
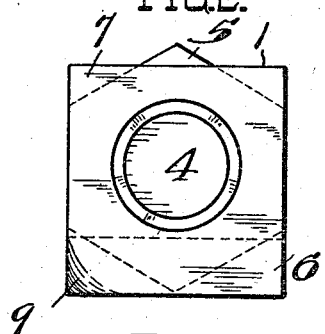 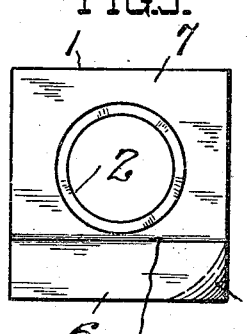 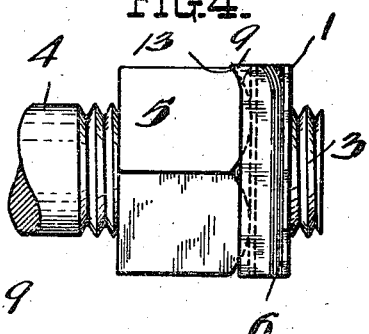
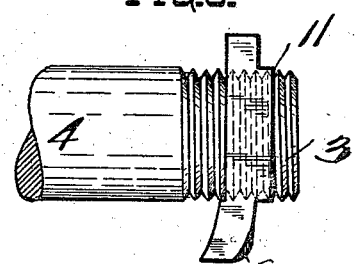 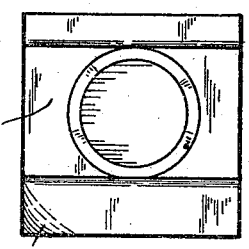
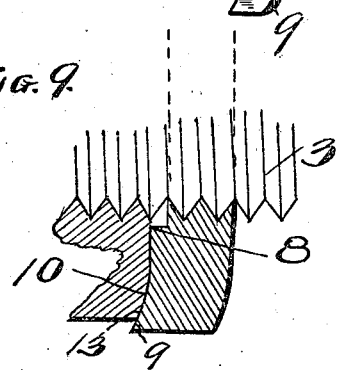 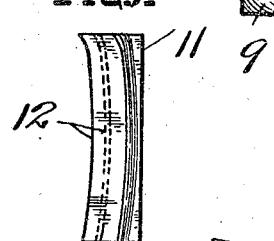 
JAMES F. COLLINS.
INVENTOR

UNITED STATES PATENT OFFICE.

JAMES F. COLLINS, OF PITTSBURGH, PENNSYLVANIA, ASSIGNOR OF ONE-THIRD TO FREDERICK T. ASCHMAN AND FIFTY-ONE ONE-HUNDREDTHS TO WILLIAM F. PHILLIPS, BOTH OF PITTSBURGH, PENNSYLVANIA.

NUT-LOCK.

1,272,380.

Specification of Letters Patent.

Patented July 16, 1918.

Application filed August 7, 1915, Serial No. 44,194. Renewed December 8, 1917. Serial No. 206,329.

*To all whom it may concern:*

Be it known that I, JAMES F. COLLINS, a citizen of the United States of America, residing at Pittsburgh, in the county of Allegheny and State of Pennsylvania, have invented certain new and useful Improvements in Nut-Locks, of which the following is a specification.

The present invention appertains to an improved nut lock which employs the elastic gripping action of a washer or plate for securely holding the nut against being slackened or backed off from the bolt, and also for securely holding the washer itself against dislodgment.

The invention is primarily for the purpose of providing a nut lock of this character which shall be simple in construction and operation and comparatively inexpensive in first cost, and which will be efficient in resisting the action of shocks or strains in service which would tend to loosen the nut or washer on the bolt.

The invention essentially resides in the peculiar construction of the elastic gripping washer which is threaded on the bolt and adapted to frictionally lock itself between the bolt threads and the castellated or rounded head of the nut, as will more fully be pointed out hereinafter.

In the accompanying drawings I have illustrated one complete embodiment of my invention and a modification thereof, constructed according to the best modes I have so far devised for the practical application of the principles of my invention.

Figure 1 is a side elevation of a bolt and nut with my improved locking washer applied thereto.

Fig. 2 is an end view of Fig. 1 showing the washer and nut and bolt. Fig. 3 is an elevation of the washer, showing its inner side. Fig. 4 is a side elevation showing the threaded end of the bolt with nut and washer applied, as seen at right angles to the position of Fig. 1. Fig. 5 is a side elevation of a modified washer threaded on the end of a bolt. Fig. 6 is an elevation of this washer from its inner side. Fig. 7 is an edge view of the washer of Figs. 5 and 6. Fig. 8 is an enlarged detail sectional view illustrating the position of the elastic washer before the gripping action takes place. Fig. 9 is a similar view, but showing the washer locked to the bolt and nut by the friction of its elastic gripping action.

The washer 1, which is preferably of steel or wrought iron and possesses the characteristics of flexibility and elasticity, is threaded at 2 to screw on the threads 3 of the standard bolt 4 upon which the nut 5 is to be locked. The washer is generally flat and rectangular in shape, its lower end 6 however being longer than the upper portion 7 in order that an offset or shoulder 8 may be fashioned to project beyond the body of the washer at its inner side with relation to the nut. In Fig. 1, particularly, it will be seen that the lower portion 6 of the washer is beveled or inclined with relation to the body portion of the washer, and that one corner, as 9, is still further bent at an angle to the beveled portion 6 of the washer. These special features, the offset or shoulder 8, the beveled portion or tongue 6 of the washer, and the turned lip or bent corner 9 of the tongue 6 are the factors in locking the washer between the threads of the bolt and the rounded or curved head 10, of the nut. In the modified form of the washer illustrated in Figs. 5 6 7 an extension 11 is provided which makes the threaded portion of the washer of greater thickness and consequently provides for a wider bearing on the bolt through its threads. An additional feature is the curved portion 12 which aids in rendering the gripping action of the washer more rigid.

It will be noted that the two sides of the portion 7 of the washer are parallel, and that the beveled faces of the portion 6 of the washer, although at an angle to the plane of the faces or sides of the portion 7, are parallel with each other.

In use, the nut is turned home on the bolt, and then the washer is threaded on the bolt end and turned up to the position indicated in Fig. 8 until the washer contacts with the nut. Greater pressure is now applied by means of a wrench and the washer is screwed up against the nut and it will be seen that the shoulder or offset 8 (Fig. 9) is jammed in between the threads of the bolt and the flat face or head of the nut, while the beveled portion of the washer is brought into close contact with the rounded or curved portion of the head of the nut. Still further movement of the washer causes the lip or bent corner 9 to impinge against and turn over the rounded edge 13 of the nut, as seen in Fig. 9. In this position the washer is securely locked against accidental dislodgment, and can only be turned back off the bolt by the application of great power to a wrench. It will be noted that the nut cannot be advanced on the bolt because the turned corner or lip which overhangs the rounded head of the nut, prevents such movement.

While I have illustrated the washer applied to a hexagonal nut it will be apparent that it is applicable to any other standard form of nut and bolt, and that the washer is ready for use without modifying or altering the typical nut and bolt.

What I claim is:—

1. A poly-sided washer of flexible elastic material formed with a threaded opening and provided with a shouldered offset, the portion of which said offset forms a part being beveled with relation to the body of the washer, and said beveled portion having an additionally bent corner.

2. The combination with a screw bolt and a nut with a rounded head of a poly-sided elastic washer having a beveled portion impinging over the rounded head of the nut and having also a bent corner over-hanging the nut between two of its corners.

In testimony whereof I affix my signature.

JAMES F. COLLINS.

Copies of this patent may be obtained for five cents each, by addressing the "Commissioner of Patents, Washington, D. C."